Feb. 20, 1962   R. E. MORGAN   3,022,429
MAGNETIC CONTROL APPARATUS
Filed June 25, 1957
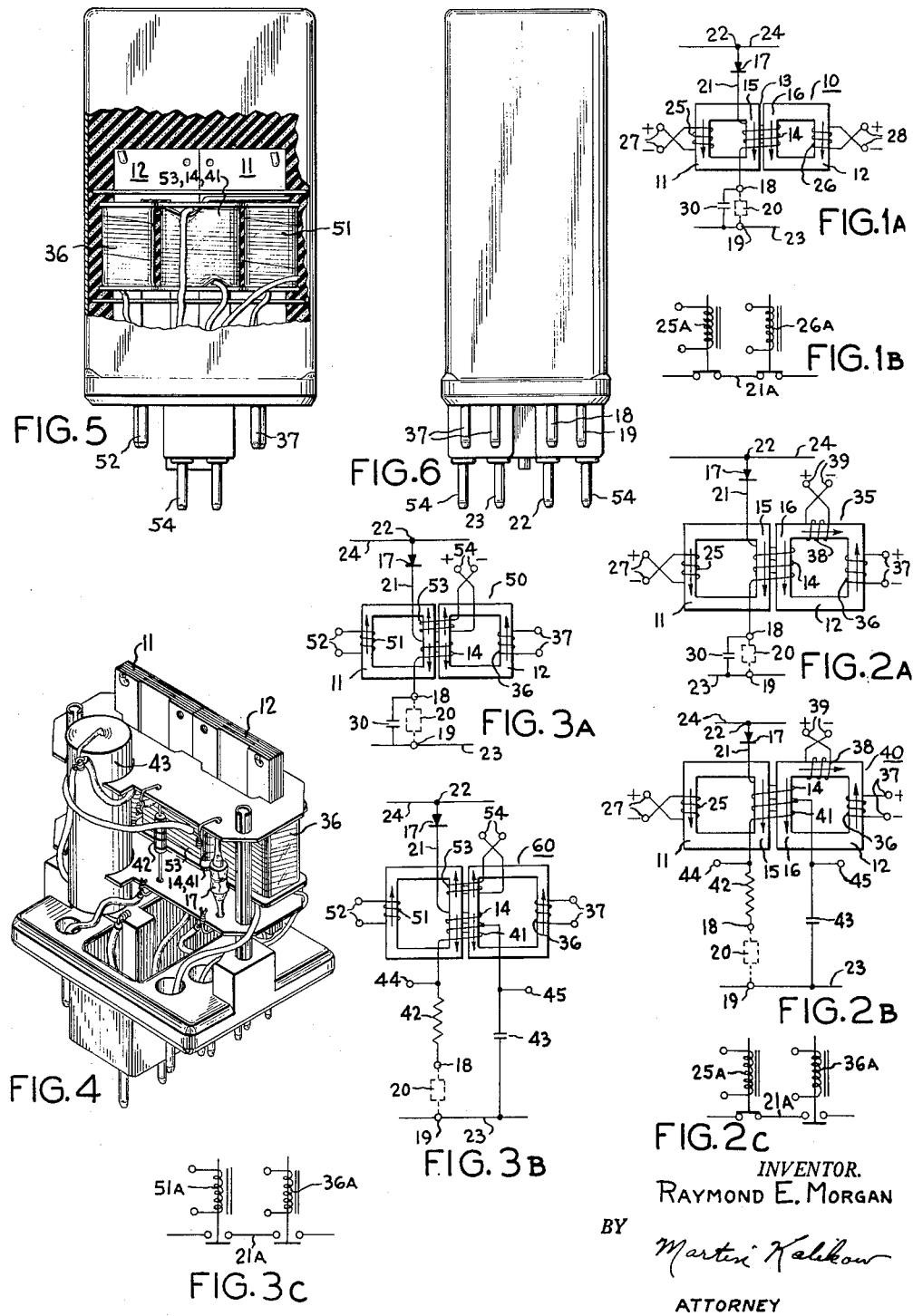
INVENTOR.
RAYMOND E. MORGAN
BY Martin Kalikow
ATTORNEY Feb. 20, 1962  R. E. MORGAN  3,022,429
MAGNETIC CONTROL APPARATUS
Filed June 25, 1957  3 Sheets-Sheet 2

INVENTOR.
RAYMOND E. MORGAN
BY Martin Kalikow
ATTORNEY

*INVENTOR.*
RAYMOND E. MORGAN
BY Martin Kalikow

ATTORNEY

3,022,429
Patented Feb. 20, 1962

3,022,429
MAGNETIC CONTROL APPARATUS
Raymond E. Morgan, Schenectady, N.Y., assignor to General Electric Company, a corporation of New York
Filed June 25, 1957, Ser. No. 667,945
12 Claims. (Cl. 307—88)

My invention relates to magnetic control apparatus and more particularly to magnetic amplifier type control elements, units and systems adapted to perform the elemental or "logical" control functions required in the automatic and semi-automatic operation of industrial tools and machinery.

Modern industrial tools and machinery such as punch presses, drill presses, lathes, etc., are now capable of performing many and varied shaping, cutting, and forming operations substantially automatically. The control equipment for such tools and machinery is becoming ever more complex and expensive as manufacturing plants move toward more complete mechanization and "automation." Conventional magnetic relays, solenoids and limit switches employing separable contacts are well adapted for the control of machinery destined to perform relatively simple operations but are not adapted, from the point of view of size, expense, reliability, and circuitry involved to control machinery destined to perform complicated and differing operations in response to a variety of control signals and influences often in many different sequences.

In order to meet this need for more versatile and reliable controls, it has been suggested that control devices be provided which do not have moving contacts and which are capable of statically switching electric currents or impulses in accord with basic logical or elemental control functions which make up the control systems. These "elemental control devices" have become known, for example, as "and," "or," "not," "memory," or "delay" units according to the particular control function which they can perform. These elemental control devices have heretofore consisted of combinations of rectifiers and electromotive forces in intricate networks such as used in electronic computers and have utilized magnetic or electronic amplifiers between each rectifier network to replace the losses resulting from the network.

Accordingly, one object of the invention is to provide magnetic control elements and circuits and elemental control devices utilizing these control elements and circuits, which have no moving contacts and are suitable for use in control systems capable of accomplishing complex control functions.

Another object of the invention is to provide elemental contactless control devices and circuits in which a magnetic amplifier control element is capable of itself performing the elemental control function without the loss of signal strength or the necessity of intricate rectifier networks.

Among the problems involved in using conventional magnetic amplifiers energized by a conventional alternating current low frequency sinusoidal power supply for such contactless elemental control devices are their relatively heavy weight, large size and expense and their insensitivity to very low power signals. Their use has therefore, been largely restricted to specially engineered higher power applications where size and expense are not a major consideration. Accordingly, another important object of the invention is to provide magnetic amplifier type contactless control elements, devices and circuits operable from a pulse power supply with high sensitivity and fast response at low power levels and having small size, light weight and low cost.

In a co-pending application Serial No. 630,936 filed by Russell A. Brown and assigned to the present assignee, now Patent No. 2,985,766, there is disclosed among other things certain pulse power responsive magnetic control apparatus capable of simulating normally open or normally closed relay contacts connected in parallel, the functions of which have become known as "or" units or "not" units. Accordingly, it is a further specific object of the invention to provide pulse power responsive magnetic control apparatus capable of simulating normally open and normally closed relay contacts connected in series thereby to function as an "and" unit or what I call a "coincidence-not" unit.

Among the technical problems involved in the use of magnetic amplifiers for such "and" or "coincidence-not" units is the fact that the output current characteristic of conventional magnetic amplifiers depends upon the amplitude of the magnetic flux introduced from each control winding. It is thus possible that the magnetic amplifier will respond to a single control winding having a large signal in the same manner as it would respond to a pair of control windings or influences each carrying a lesser signal. Where it is desired to simulate the operation of contacts connected in series, however, it is essential that the magnetic amplifier be constructed to respond only to a combination of signal influences regardless of the magnitude of each of the signals so long as they are above certain minimum or threshold values. Accordingly, another object of the invention is to provide magnetic amplifier devices and circuits whose output is responsive to the presence of a predetermined combination of electrical signals regardless of variations in amplitude of these signals above certain minimum values.

In general, in accord with the invention, magnetic control apparatus is provided having at least two adjacent independent, high-permeability or "saturable" magnetic cores in which a single gate winding surrounds portions of both cores and is connected in series with a rectifier in a load circuit adapted for connection across a suitable source of electric power. Means are also provided for introducing independent control fluxes in both cores. Because of this arrangement each core becomes quickly saturated or desaturated in response to its control flux, but the gate winding becomes conductive only when both cores are saturated.

In accord with further features of the invention, the apparatus is adapted to be connected in cascade and energized from a source of pulse power, feedback means are provided for introducing a snap acting transition between the two output conduction states, and various biasing arrangements are provided for producing different patterns of control such as exemplified by serially connected normally opened or normally closed contacts in various combinations.

The novel features believed characteristic of the invention are set forth in the appended claims. The invention itself, however, together with further objects and advantages thereof may be easily understood by referring to the following description taken in connection with the accompanying drawings in which, FIGURE 1A is a schematic diagram of a basic form of the invention comparable in function with the relay contact arrangement shown in FIGURE 1B;

FIGURES 2A and 2B are schematic circuit diagrams of another form of the invention comparable in function to the relay contact arrangement shown in FIGURE 2C;

FIGURES 3A and 3B are embodiments of yet another form of the invention comparable in function to the relay contact arrangement shown in FIGURE 3C;

FIGURES 4, 5 and 6 are perspective and elevation views respectively of control apparatus structure corresponding to the circuit diagram of FIGURE 3B;

Figure 14:
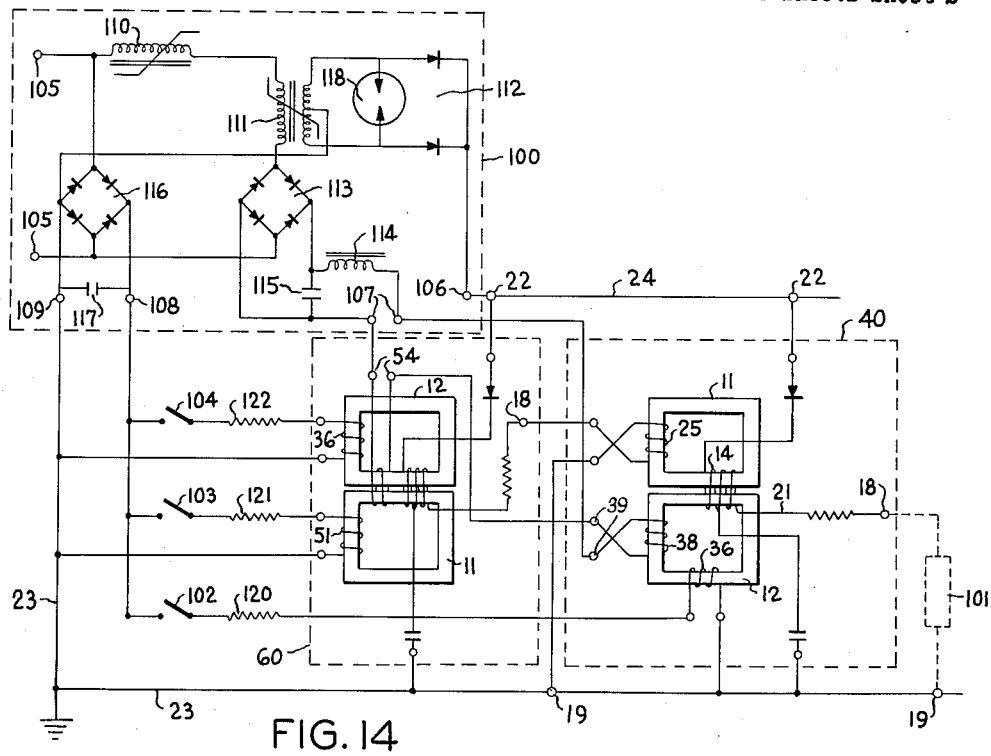
FIGURE 14 is a schematic circuit diagram of a typical control system utilizing an "and" unit and a "coincidence-not" unit of FIGURES 2B and 3B.

Referring to FIGURE 1A, a simplified form of the invention is shown as a "not" unit 10 whereby an output electric current is turned off whenever either of two input signals is present. The function of this unit is, therefore, comparable to two normally closed relays whose contacts are connected in series, as shown in FIGURE 1B. "Not" unit 10 comprises a saturable reactor including two saturable magnetic cores 11 and 12 of high permeability magnetic material such as Deltamax, each core preferably in the form of a closed loop and separated as independent from the other core by virtue of a non-magnetic gap 13. Although cores 11 and 12 are illustrated as being physically spaced from one another, it will be appreciated that in actual construction they may abut one another. In magnetic effect, however, they will still have an effective non-magnetic gap between them since the reluctance of the magnetic path in each loop of each core is many times less than the reluctance of the magnetic path between the two cores and across this gap 13 even under such abutting conditions. If this gap is eliminated the apparatus may still continue to function as described hereinafter but only with greatly reduced sensitivity and reliability. A gate winding 14 surrounding center leg portions 15 and 16 respectively of cores 11 and 12 is connected in series with a rectifier 17 in an output load circuit 21 including output terminals 18, 19 across which any desired electric load impedance 20 may be connected. Load circuit 21 is adapted to be connected through terminals 19, 22 to any suitable source of alternating or pulsating power indicated by lines 23, 24. For reasons to be explained, load circuit 21 is preferably connected to a source of pulse power.

In accord with the invention, means are provided for introducing independent control fluxes into the two magnetic cores 11 and 12 respectively. Such control fluxes may, for example, be introduced by the movement of permanent magnets into proximity with the cores. In the apparatus of FIGURE 1A, this is preferably accomplished, however, by control windings 25 and 26 wound on the outer leg portions of each of the cores 11 and 12 respectively. Control windings 25 and 26 are provided with input terminals 27 and 28 respectively. In the "not" unit 10 of FIGURE 1A, control windings 25 and 26 are each wound and connected so as to produce magnetic flux in their respective cores 11 and 12 in a direction opposing the magnetic flux produced in these cores by the gate winding 14 as a result of the unidirectional current flowing in load circuit 21, as indicated by the various arrows.

In the operation of "not" unit 10, terminals 19, 22 of load circuit 21 are connected to a suitable source of alternating or pulsating power 23, 24, and control winding terminals 27, 28 are connected to receive unidirectional signal voltages of the polarity indicated. In the absence of control signal voltages rectifier 17 allows pulsating unidirectional voltage to be applied across gate winding 14 of an amplitude sufficient quickly to drive magnetic cores 11 and 12 into saturation during each pulsation causing gate winding 14 to conduct or "fire" so as to pass corresponding current pulses to a load impedance 20 connected between output terminals 18, 19. A capacitor 30 may be connected across terminals 18, 19 to help smooth out the load current pulsations and to aid in the recovery or "reset" of gate winding 14 between pulses.

Upon the occurrence of a signal voltage at control winding terminal 27 or 28, control flux is introduced in core 11 or 12 opposing that produced therein by gate winding 14. The control signal activated core is, therefore, not driven into saturation and since the gate winding links portions of both cores, the magnetic effect of the unsaturated core prevents the gate winding from conducting, and only a small magnetizing current flows in the output load circuit 21. If control signals appear at both control winding terminals 27 and 28, both magnetic cores 11 and 12 are driven out of saturation and gate winding 14 likewise remains non-conductive. The "not" unit 10 thus simulates two electro-magnetic relays 25A, 26A (FIGURE 1B) having their normally closed contacts connected in series, each control winding being effective to interrupt the load circuit current. It will be observed, however, that in accord with the invention each core 11 or 12 acts independently upon the gate winding and that one core alone is effective to drive the load circuit out of conduction even if the other core is fully saturated. Although other magnetic amplifier circuits capable of performing the function of "not" units have been provided, this principle of independent control of a common gate winding is important in permitting the attainment of magnetic amplifier type "coincidence-not" units and "and" units which have heretofore not been successfully achieved in a commercially practical form.

Referring now to FIGURE 2A, there is shown a "coincidence-not" magnetic amplifier unit comparable in function to two electromagnetic relays 25A, 36A having normally closed and normally open contacts connected in series, as shown in FIGURE 2C. The "coincidence-not" unit 35 of FIGURE 2A is substantially identical to the "not" unit 10 of FIGURE 1A with the exception that one of the control windings 36 is wound and connected to its terminals 37 in a manner such that the control flux introduced thereby is in a direction opposite to that produced by the control winding 26 of the "not" unit 10, and an additional bias winding 38 is wound on core 12 and connected to its input terminals 39 so as to produce magnetic flux in core 12 opposing that produced by control winding 36. It will thus be seen that in the "coincidence-not" unit 35 of FIGURE 2A, one control winding 25 introduces control flux in its magnetic core 11 which opposes that introduced therein by gate winding 14 while the other control winding 36 introduces magnetic flux in its core 12 which aids the flux produced therein by gate winding 14, and the bias winding 38 produces flux in this core 12 which opposes the gate winding flux.

In the operation in the "coincidence-not" unit 35, bias winding 38 is connected to a source of unidirectional current and control windings 25 and 36 are each connected to receive input unidirectional control signal voltages of the polarities indicated while the load circuit 21 is connected across a suitable source of electric power through lines 23, 24. In the absence of control signal voltages at control windings 25 and 36, the load circuit 21 is in its relatively non-conducting state since magnetic core 12 is kept non-saturated as a result of the magnetic flux introduced by bias winding 38. Magnetic core 11 is driven into saturation as a result of the gate winding flux but this is not effective to make the gate winding conductive because of the independent action upon the gate winding 14 of non-saturated core 11. Upon the occurrence of a signal voltage at terminals 27 of control winding 25, magnetic core 11 also becomes desaturated and the gate winding 14 remains non-conductive. If a control voltage appears at terminals 37 of control winding 36 but not at terminals 27 of control winding 25, the magnetic flux introduced by control winding 36 counteracts the biasing flux of bias winding 38 and permits magnetic core 12 to be driven into saturation by the gate winding flux. Under these conditions both magnetic cores 11 and 12 are driven into saturation by the flux of gate winding 14 and the gate winding becomes conductive, permitting load circuit current to flow. It is this coincidence resulting in an output current when one control signal remains on one control winding 36, and another control signal disappears or fails to appear on the other control winding 25 which gives this magnetic control apparatus the name of a "coincidence-not" unit.

If control signal voltages occur at the terminals 27 and 37 of both control windings 25 and 36, the load circuit again becomes non-conducting due to the desaturation of magnetic core 11 under the influence of its control winding 25, thereby preventing conduction through gate winding 14 even though magnetic core 12 remains saturated.

Referring now to FIGURE 2B, there is shown a modification of the "coincidence-not" unit of FIGURE 2A whereby the magnetic amplifier is constructed to operate with snap action between its conducting and non-conducting conditions. The "coincidence-not" unit 40 of FIGURE 2B is similar to that of unit 35 but includes a feedback winding 41 connected in series with gate winding 14 and preferably wound as an extension thereof around the center core legs 15 and 16 of saturable cores 11 and 12 respectively. A resistor 42 is preferably also connected in series with the load circuit 21 and a capacitor 43 is connected from the point of connection between gate winding 14 and feedback winding 41 to output terminal 19 either directly or through line 23 as shown. Capacitor 30 may be omitted in view of the presence of capacitor 43. Resistor 42 may also be omitted if the impedance of load 20 to be connected between output terminals 18 and 19 is great enough. Additional output terminals 44 and 45 may, if desired, be connected to the upper ends of resistor 42 and capacitor 43 respectively.

The operation of the "coincidence-not" unit 40 is similar to that described above in connection with the "coincidence-not" unit 35 with the exception that the feedback winding 41 and capacitor 43 function to sustain current in the load circuit during the usual periods of reset or relaxation between each alternation or pulsation of source current. As a consequence any slight increase in load circuit current, as for example, when both magnetic cores 11 and 12 approach saturation causes an immediate regeneration of additional saturating flux in the cores, quickly driving the cores deeply into saturation. Similarly, any decrease in load circuit current as either core begins to drop out of saturation produces an immediate degeneration in the magnetic flux in that core as the result of feedback winding 41 and quickly drives the core far out of saturation. The unit thus operates with snap action between its conducting and non-conducting conditions of operation. The general use of a feedback winding 41 connected in series with a gate winding 14 together with a capacitor 43 connected in parallel with the gate winding to provide such snap action forms a portion of the subject matter of the aforementioned co-pending application Serial No. 630,936.

Referring now to FIGURE 3A, there is shown a magnetic amplifier "and" unit 50 comparable in function to two normally open relays having their contacts connected in series as shown in FIGURE 3C. "And" unit 50 is similar to the "coincidence-not" unit 35 of FIGURE 2A with the exception that both control windings 36 and 51 are wound on their respective cores 12 and 11 and connected across their input terminals 37 and 52 so as to introduce control flux in their respective cores aiding the magnetic flux produced therein by gate winding 14. In addition, the bias winding 53 surrounds portions, such as the central legs 15 and 16, of both magnetic cores 11 and 12, and is wound and connected to its terminals 54 so as to produce magnetic flux in these cores opposing that produced by gate winding 14.

In the operation of "and" unit 50, a substantially constant unidirectional current is supplied to bias winding terminals 54 and the control windings 36 and 51 are connected to receive unidirectional signal voltages of the polarity indicated, while the load circuit 21 is connected across power lines 23 and 24. In the absence of control voltage at either control winding 36 or 51, core 11 or core 12 as the case may be remains non-saturated due to the presence of biasing flux produced therein opposing the gate winding flux, and only magnetizing load current flows in load circuit 21. Upon the occurrence of a control voltage at the terminals of one control winding but not the other, one of the magnetic cores 11 or 12 is driven into saturation, but this is not sufficient to cause the gate winding 14 to conduct because the other core remains unsaturated. This non-conduction of current in load circuit 21 occurs even though the control signal on one of the control windings is several times greater than that required to drive its associated core into saturation. Upon the application of control signal voltages to both control windings 36 and 51, however, both magnetic cores 11 and 12 are saturated and gate winding 14 conducts to permit load circuit current to flow. It will be observed that the signal voltage on each control winding 36, 51 need only be great enough to overcome the flux introduced by bias winding 53 in its associated core which bias flux need only, in turn, be great enough to prevent saturation of the core under the influence only of the gate winding 14. It will thus be observed that the "and" unit 50 may be constructed to be sensitive to input signal voltages of unusually low amplitude and that the occurrence of load circuit conduction depends only upon the presence of both control signals simultaneously and not upon the amplitude of either signal beyond the value required to overcome the bias flux.

Referring now to FIGURE 3B, there is shown an "and" unit 60 similar to the "and" unit 50 but incorporating feedback winding 41, resistor 42, and capacitor 43 in a manner similar to that described above in connection with "coincidence-not" unit 40 of FIGURE 2B thereby to provide snap-action for "and" unit 60 between its conducting and non-conducting conditions of operation.

One physical embodiment of the "and" unit 60 represented by the schematic circuit diagram of FIGURE 3B is shown in FIGURES 4, 5 and 6. In these figures similar components are designated by the same reference numerals. The actual construction and arrangement of the various components forms a portion of the subject matter of a co-pending application Serial No. 691,775 filed October 22, 1957 in the name of Charles J. Adams and assigned to the present assignee, and now Patent 2,999,222.

Figure 7:
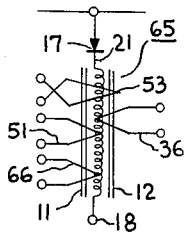
FIGURES 7, 8 and 9 are schematic diagrams of modified winding arrangements for the forms of the invention shown in FIGURES 2 and 3 and comparable respectively to the relay contact of arrangements shown in FIGURES 7A, 8A and 9A.
Figure 7A:
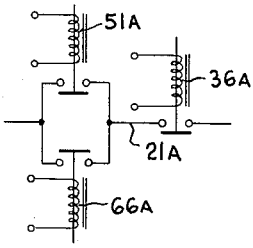

It will be appreciated that additional control windings may be included on magnetic cores 11 and 12 of the various "not," "coincidence-not" and "and" units, if desired. The inclusion of an additional control winding on any core enables the core to be saturated or desaturated, as the case may be, either by the original control winding or the additional one. Where the saturable core and original control winding simulate a normally open electromagnetic relay, the inclusion of an additional similarly poled control winding is comparable with the connection of an additional normally open electromagnetic relay in parallel with the original relay. This is illustrated by the schematic diagrams of FIGURES 7 and 8. In FIGURE 7 there is shown an "and" unit 65 having a common bias winding 53, original control windings 36 and 51 and an additional control winding 66 wound on magnetic core 11. The equivalent electromagnetic relay circuit diagram is shown in FIGURE 7A, in which corresponding components are designated by similar reference numerals followed by the letter A.

Figure 8:
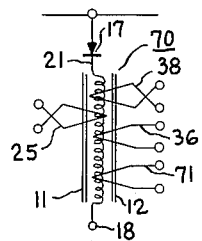
Figure 8A:
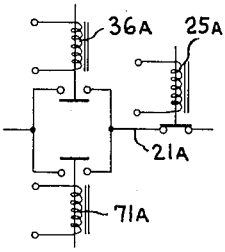
Figure 9:
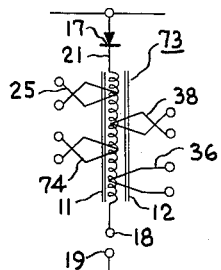
Figure 9A:
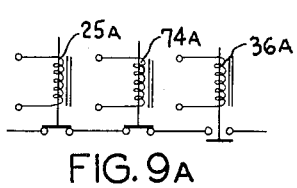

In FIGURE 8, there is shown a "coincidence-not" unit 70 having a bias winding 38, original control windings 25 and 36 and an additional control winding 71 wound on magnetic core 12. The corresponding electromagnetic relay circuit is shown in FIGURE 8A.

Where the original saturable core and associated winding represents a normally closed electromagnetic relay, the inclusion of an additional control winding corresponds to the addition of another normally closed electromagnetic relay connected in series with the original normally closed electromagnetic relay. This is shown in FIGURE 9 wherein a "coincidence-not" unit 73 is illustrated having a bias winding 38, original control windings 25 and 36, and an additional control winding 74 wound on saturable core 11 in the same direction as original winding 25 thereon. The corresponding electromagnetic relay circuit is shown in FIGURE 9A.

Figure 10:
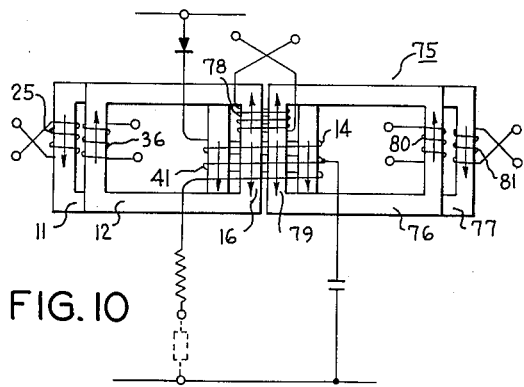
FIGURE 10 is a circuit diagram of magnetic control apparatus similar to that of FIGURE 2B but using four magnetic cores rather than two and comparable in function with the relay contact arrangement shown in FIGURE 10A.
Figure 10A:
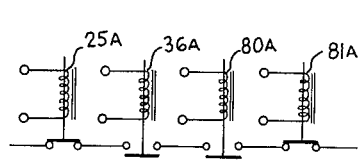

Although I have described above typical control units employing only two saturable cores, it has been found that a considerably greater number of additional magnetic cores may be employed with a single gate winding to conjointly control the conduction in load circuit 21. Up to 10 independent cores have been used with a single load circuit connected to a suitable source of pulse power. Referring to FIGURE 10 there is shown a "coincidence-not" unit 75 employing 4 such saturable cores, 11, 12, 76 and 77 respectively. In "coincidence-not" unit 75 a single bias winding 78 surrounds portions, such as the central legs 16 and 79, of cores 12 and 76 respectively and the control windings 36 and 80 on these cores 12 and 76 are wound and connected to introduce control flux aiding that produced by gate winding 14 and opposing that produced by bias winding 78. The gate winding 14 and feedback winding 41 surround portions, such as the central legs, of all of the cores 11, 12, 76 and 77 as shown. The control windings 25 and 81 on saturable cores 11 and 77 are wound and connected to introduce control flux opposing that produced by the gate winding 14 and feedback winding 41. The operation of "coincidence-not" unit 75 is similar to the "coincidence-not" unit 40 of FIGURE 2B except that control signals must be present on both control windings 36 and 80 and absent from control windings 25 and 81 before the gate winding 14 will be conductive and permit load circuit current to flow. Under any other combination of control signal voltages one of the magnetic cores will be unsaturated and will function to prevent load circuit current. The analogous electromagnetic relay circuit is shown in FIGURE 10A, corresponding control windings being designated by the same reference numerals followed by the letter A.

Figure 11:
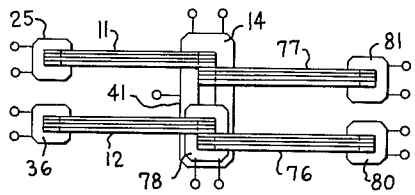
FIGURE 11 is a top view of a core and coil arrangement suitable for use in the magnetic control apparatus of FIGURE 10.

Referring to FIGURE 11, there is shown one suitable physical arrangement for the saturable cores and windings of the "coincidence-not" unit 75 of FIGURE 10. In this figure the various cores and windings are designated by the same reference numerals as that in FIGURE 10.

Figure 12:
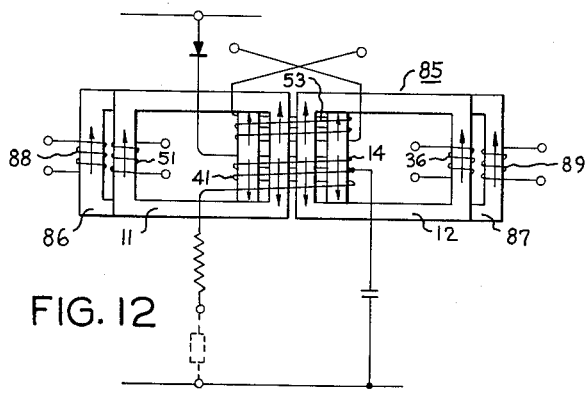
FIGURE 12 is a circuit diagram of a coincidence-not unit similar to that of FIGURE 3B but using four magnetic cores rather than two and comparable in function with the contact arrangement shown in FIGURE 12A.
Figure 12A:
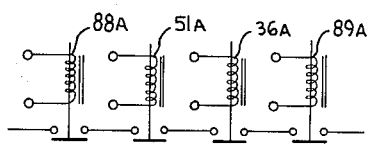
Figure 13:
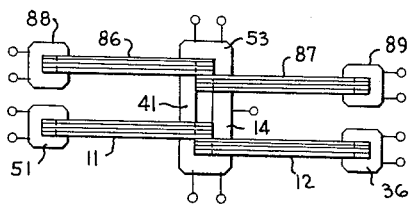
FIGURE 13 is a top view of a core and coil arrangement suitable for use in the magnetic control apparatus of FIGURE 12.

Referring to FIGURE 12, there is shown a four input "and" unit 85 similar to the two input "and" unit 60 of FIGURE 3B but employing two additional cores 86 and 87 carrying additional control windings 88 and 89 respectively. The bias winding 53, gate winding 14 and feedback winding 41 are all wound around portions, such as the central legs, of all of the four cores 11, 12, 86, 87. The corresponding electromagnetic relay circuit is shown in FIGURE 12A and a suitable core and winding arrangement is shown in FIGURE 13, the corresponding components being designated by similar reference numerals.

Referring now to FIGURE 14, I have shown a simplified control system utilizing elemental control units in accord with the invention. A pulse power supply shown within dashed rectangular line 100 supplies pulse power, bias current and original input current to an "and" unit 60 and a "coincidence-not" unit 40.

As mentioned above, the load circuits 21 of the various control units of the invention are preferably connected to a source of pulse power. The term "pulse power" is used herein to mean a source of periodic pulses of electric voltage and current, each pulse having an abrupt rise and fall and having a much shorter duration than the duration of a half wave of sinusoidal current at 60 cycles. Preferably the ratio of pulse time to no pulse time during each cycle is considerably less than .1 and the voltage rise along the pulse wave front occurs during less than three degrees (3°) of a sinusoidal wave at 60 cycles. For example, square wave pulses of 400 microseconds duration at a repetition frequency of 120 pulses per second has been found to be excellent for the intended purpose.

The use of a pulse power supply to energize the magnetic control units of the invention not only permits a reduction in size and expense of the saturable reactor, rectifier, and capacitor but also greatly improves the overall operation of the units. It will be appreciated that in the control condition where one core 11 is saturated and the other is not, that the saturated core 11 provides an inductive load for the non-saturated core which is controlling the non-conduction of the gate winding. With a sinusoidal power supply this inductive load is much greater than with a pulse power supply for the load circuit 21 and the speed of response to a change in control signal is, therefore, much slower. With a pulse power supply the long period of time between power pulses is quite ample to permit discharge of the energy of this inductive load and reset of the controlling core to its no signal condition. In addition, with a pulse power supply the rectifier may have a lower peak inverse voltage rating compared to the required positive peak of voltage and the capacitor 30 may have less capacitance thereby permitting these components to be smaller and cheaper than when sinusoidal power supply is used.

The objective of the circuit of FIGURE 14 is to supply output current to a load impedance 101 whenever one input switch 102 is closed and either or both of two other inputs switches 103 and 104 remain open, but to turn off current to this load impedance 101 whenever switch 102 is open or all three switches 102, 103 and 104 are closed during the same time. Such a system is desirable, for example, where switch 102 is a master switch for controlling current to load impedance 101, and switches 103 and 104 are switches controlled by other circuits which are desired never to be closed simultaneously without turning off the current flowing through load impedance 101.

The pulse power supply has a pair of input terminals 105 for receiving an alternating sinusoidal power frequency voltage, a pulse power output terminal 106, a pair of bias currents supplying output terminals 107, an original signal current output terminal 108 and a common return terminal 109 for the signal current and pulse power outputs. A saturable reactor 110, a saturable transformer 111 and a full wave rectifier 112 within power supply 100 convert the alternating sinusoidal voltage into periodically recurring unidirectional pulses of power between terminals 106 and 109 at a frequency of 120 pulses per second. Another full wave rectifier 113 in series with the primary of transformer 111 together with another reactor 114 and capacitor 115 provide unidirectional substantially constant output current between bias terminals 107. Yet another full wave rectifier 116 connected directly across input terminals 105 together with a capacitor 117 provide unidirectional substantially constant output current between terminals 108 and 109. A thyrite disk element 118 connected across the secondary of pulse transformer 111 serves to clip the peaks of the output pulses to a constant voltage amplitude.

The pulse power available at terminals 106 and 109 is connected to the power receiving terminals 19, 22 of both "and" unit 60 and "coincidence-not" unit 40 through power lines 23, 24. The bias current available at terminals 107 is connected to the bias signal receiving terminals 54 of "and" unit 60 and to the bias signal receiving terminals 39 of "coincidence-not" unit 40 in series circuit relationship. Because of this series circuit connection of the bias windings of the units, any current flowing through the primary winding of pulse transformer 111 must also flow through these bias windings. Consequently, any failure in the bias windings or bias circuit will also open or interrupt the circuit of current flowing to the pulse transformer and extinguish the output power pulse. The system is thus "fail safe" with respect to a failure in bias current. Control windings 36 and 51 of "and" unit 60 and control winding 36 of "coincidence-not" unit 40 are respectively connected in parallel with signal current terminals 108, 109 of power supply 100 through switches 102, 103 and 104 and current limiting resistors 120, 121 and 122 respectively. The output voltage of "and" unit 60 at its output terminal 18 is connected across a load impedance corresponding to the impedance 20 of FIG. 3B and comprising the control winding 25 of "coincidence-not" unit 40. It will be appreciated that the various control units may be connected in cascade in this manner by using the control winding of one unit as the load impedance for receiving the output voltage of a preceding control unit. The output voltage of the "coincidence-not" unit 40 at its output terminal 18 is connected across load impedance 101.

In the operation of the circuit of FIGURE 14 with all switches 102, 103 and 104 open so that no control signal voltages are supplied to control windings 36 and 51 of "and" unit 60 or to control winding 36 of coincidence "not" unit 40, the magnetic cores 11 and 12 of "and" unit 60 are desaturated as a result of the bias winding flux, and the magnetic core 12 of "coincidence-not" unit 40 is also desaturated as a result of the biasing flux of its bias winding 38. The magnetic core 11 of "coincidence-not" unit 40, however, is in a saturated condition since there is no biasing flux or control winding flux in this core 11 and the core is driven into saturation by the gate winding flux. When switch 102 is closed, the magnetic core 12 of "coincidence-not" unit also becomes saturated as the result of the introduction of control flux from its control winding 36 with the result that the gate winding 14 snaps into a conducting state and delivers output current in load circuit 21 to load impedance 101. Whenever switch 102 is opened again, magnetic core 12 of "coincidence-not" unit 40 snaps into its unsaturated condition causing an interruption of current through gate winding 14 and load circuit 21.

Presuming switch 102 closed however, the closure of switch 103 or 104 alone will not suffice to interrupt current to load impedance 101. As either switch 103 or 104 is closed either saturable core 11 or saturable core 12 of "and" unit 60 will become saturated as it receives the input signal voltage but no output signal current will flow to control winding 25 of "coincidence-not" unit 40 since one of the cores of the "and" unit 60 will still remain unsaturated. However, if both switches 103 and 104 are closed and delivering signal voltages to both control windings 36, and 51 of "and" unit 60, both cores 11 and 12 of this "and" unit 60 will be saturated and a load circuit current will flow to the control winding 25 of "coincidence-not" unit 40 thereby desaturating the saturable core 11 of this "coincidence-not" unit and interrupting the output circuit current of the "coincidence-not" unit 40 to load impedance 101.

It will thus be seen that I have provided contactless magnetic amplifier type elemental control units capable of simulating serially connected normally closed or normally open electromagnetic relays in various combinations. The units are relatively inexpensive requiring few components in addition to the saturable reactor portion of the apparatus. Since the units are quite sensitive and operate in response to low power load, signal and bias currents, the saturable reactor apparatus itself may be quite small and inexpensive. For example, a typical two input "and" unit 60 such as shown in FIGURES 3B, 4, 5 and 6 includes saturable reactor apparatus made up of two magnetic cores 11 and 12 each consisting of a rectangular stack of laminations 1/8" thick and 3/8" wide. All of the gate, feedback and control windings are of number 34 copper wire having a diameter of 0.0063" while the bias winding is of number 28 copper wire having a diameter of 0.0126". Bias winding 53 has 8 turns, control windings 36 and 51 each have 500 turns, gate winding 14 has 900 turns and feedback winding 41 has 200 turns. Rectifier 17 is a small germanium or silicone diode and capacitor 43 has a capacitance of 2 microfarads while resistor 17 has a resistance of 7,500 ohms. The power pulses supplied from power supply 100 typically have an amplitude of 55 volts, a duration of 400 microseconds and a pulse repetition frequency of 120 pulses per second. A typical bias current is 0.44 ampere.

Although I have described my invention above in connection with specific circuits and embodiments thereof many modifications may be made, including, for example, the use of washer or toroid cores and it is to be understood therefore that I intend to cover all such modifications as fall within the true spirit and scope of the invention.

What I claim as new and desire to secure by Letters Patent of the United States is:

1. Magnetic control apparatus comprising two closed saturable magnetic cores, a gate winding surrounding portions of both cores, a load circuit including a rectifier connected in series with said gate winding, and means for independently introducing magnetic control fluxes in each of said cores respectively, said load circuit having terminals to be connected to a source of voltage to energize the gate winding through said rectifier by unidirectional current sufficient to saturate both cores in the absence of said control fluxes, said gate winding presenting a low impedance to the unidirectional energizing current to pass such current through the load circuit only when both cores are saturated.

2. The magnetic control apparatus of claim 1 wherein said means for independently introducing control fluxes comprises a pair of control windings each solely on a respective one of said cores.

3. The magnetic control apparatus of claim 2 wherein said control windings are constructed and arranged on said cores to introduce control flux in said cores opposing the flux produced therein by said gate winding.

4. Magnetic control apparatus comprising two closed saturable magnetic cores separated by a non-magnetic gap, a gate winding having turns surrounding portions of both cores, a load circuit including a rectifier connected in series with said gate winding, means independent of said gate winding for introducing biasing magnetic flux in one core opposing the gate winding flux produced in said one core, means for introducing control magnetic flux in said one core aiding the gate winding flux produced in said one core and means independent of said last mentioned means for introducing control magnetic flux in said other core opposing the gate winding flux produced in said other core, said load circuit having terminals to be connected to a source of voltage to energize said gate winding through the rectifier by unidirectional current sufficient to saturate said cores in the absence of said control fluxes, said gate winding presenting a low impedance to the unidirectional energizing current to pass such current through the load circuit only when both of said cores are saturated.

5. The magnetic control apparatus of claim 4 wherein said means for introducing biasing flux comprises a biasing winding on said one core and said means for introducing control fluxes comprises a pair of control windings each on a respective one of said cores.

6. Magnetic control apparatus comprising two independent closed saturable magnetic cores located adjacent one another, a gate winding having turns surrounding portions of both cores, a load circuit including a rectifier connected in series with said gate winding, a bias winding having turns surrounding portions of both cores, said bias winding being independent of said gate winding and having a pair of terminals to be energized from a source of unidirectional current to produce biasing fluxes in said cores opposing gate fluxes produced therein by energization of said gate winding, and means for independently introducing magnetic control fluxes in each of said cores respectively which aid the gate fluxes produced in the cores by energization of the gate winding, said load circuit having terminals to be connected to a source of voltage to energize said gate winding by unidirectional current sufficient to saturate said cores in the absence of said control fluxes, said gate winding presenting a low impedance to the unidirectional energizing current to pass such current through the load circuit only when both cores are saturated.

7. Magnetic control apparatus comprising two independent closed saturable magnetic cores located adjacent one another, a gate winding surrounding portions of both cores, a feedback winding connected in series with said gate winding and surrounding portions of both cores, a rectifier connected in series with said gate and feedback windings for connection in series with an electric load impedance, said series connected elements constituting a load circuit having terminals to be connected across a source of electric power, said gate and feedback windings being arranged to produce when energized flux in said cores in the same direction, a capacitor connected to said feedback winding for connection in parallel circuit relation therewith, and means for independently introducing magnetic control fluxes in each of said cores respectively, said gate winding being energized through said rectifier from said source by unidirectional current sufficient to saturate said cores in the absence of said control fluxes, said gate winding presenting a low impedance to the unidirectional energizing current to pass such current through the load circuit only when both of said cores are saturated, said feedback winding and said capacitor being selected to sustain current in said load circuit during intervals between pulses of said unidirectional current.

8. Magnetic control apparatus comprising two independent closed saturable magnetic cores located adjacent one another, a gate winding having turns surrounding portions of both cores, a feedback winding connected in series with said gate winding and having turns surrounding portions of both cores, a pair of output terminals, a load circuit including a rectifier connected in series with said gate winding, a feedback winding and output terminals for connection across a source of electric power, a capacitor connected in parallel with said feedback winding and said output terminals, a pair of independently energized control windings each on a respective one of said cores, and a bias winding independent of said gate winding on at least one of said cores in flux opposition with said gate winding, feedback winding and control winding, said gate winding being energized through said rectifier from said source by unidirectional current sufficient to saturate said cores in the absence of control fluxes produced by energization of said control windings, said gate winding presenting a low impedance to the unidirectional energizing current to pass such current through the load circuit only when both of said cores are saturated, said feedback winding and said capacitor being selected to sustain current in said load circuit during intervals between pulses of said unidirectional current.

9. Magnetic control apparatus comprising two independent closed saturable magnetic cores located adjacent one another, a gate winding having turns surrounding portions of both cores, a feedback winding connected in series with said gate winding and having turns surrounding portions of both cores, a pair of output terminals, a load circuit including a rectifier connected in series with said gate winding, feedback winding and output terminals for connection across a source of electric power, a first control winding on one of said cores, a bias winding independent of said gate winding on said one core arranged in flux opposition with said gate winding, feedback winding and said first control winding, a capacitor connected in parallel with said feedback winding and output terminals, and a second control winding on said other core energized independently of said first control winding and arranged in flux opposition with said gate and feedback windings, said gate winding being energized through said rectifier from said source by unidirectional current sufficient to saturate said cores in the absence of control fluxes produced by energization of said control windings, said gate winding presenting a low impedance to the unidirectional energizing current to pass such current through the load circuit only when both of said cores are saturated, said feedback winding and said capacitor being selected to sustain current in said load circuit during intervals between pulses of said unidirectional current.

10. Magnetic control apparatus comprising two independent closed magnetic cores located adjacent one another, a gate winding having turns surrounding portions of both cores, a feedback winding connected in series with said gate winding and having turns surrounding portions of both cores, a pair of output terminals, a load circuit including a rectifier connected in series with said gate winding, feedback winding and output terminals for connection across a source of electric power, a capacitor connected in parallel circuit relation with said feedback winding and output terminals, a pair of independently energized control windings each mounted on a respective one of said cores, and a bias winding independent of said gate winding having turns surrounding portions of both cores and arranged in flux opposition with said gate winding, feedback winding and control windings, said gate winding being energized through said rectifier from said source by unidirectional current sufficient to saturate said cores in the absence of control fluxes produced by energization of said control windings, said gate winding presenting a low impedance to the unidirectional energizing current to pass such current through the load circuit only when both of said cores are saturated, said feedback winding and said capacitor being selected to sustain current in said load circuit during intervals between pulses of said unidirectional current.

11. Magnetic control apparatus comprising two independent closed saturable magnetic cores located adjacent one another, a gate winding surrounding portions of both cores, a source of pulse power, a load circuit including a rectifier connected in series with said gate winding across said pulse power source, and means for independently introducing magnetic control fluxes in each of said cores respectively, said gate winding being energized through said rectifier from said source by unidirectional pulses sufficient to saturate said cores in the absence of said control fluxes, said gate winding when energized presenting a low impedance to said pulses to pass such pulses through the load circuit only when both of said cores are saturated.

12. Magnetic control apparatus comprising two closed saturable magnetic cores separated by a non-magnetic gap, a gate winding having turns surrounding both cores, a rectifier, a pair of output terminals, a source of pulse power, said rectifier, gate winding, output terminals constituting a load circuit connected in series across said pulse power source, means independent of said gate winding for introducing magnetic biasing flux in at least one of said cores which opposes magnetic flux produced by energization of said gate winding, and means for independently introducing mangetic control fluxes in each of said cores respectively, said gate winding being energized through said rectifier from said source by unidirectional pulses sufficient to saturate said cores in the absence of said control fluxes, said gate winding when energized presenting a low impedance to said pulses to pass such pulses through the load circuit only when both of said cores are saturated.

References Cited in the file of this patent

UNITED STATES PATENTS

| | | |
|---|---|---|
| 2,498,475 | Adams | Feb. 21, 1950 |
| 2,512,317 | Edwards et al. | June 20, 1950 |
| 2,689,328 | Logan | Sept. 14, 1954 |
| 2,745,908 | Cohen et al. | May 15, 1956 |
| 2,770,739 | Grayson | Nov. 13, 1956 |
| 2,776,380 | Andrews | Jan. 1, 1957 |
| 2,780,771 | Lee | Feb. 5, 1957 |
| 2,801,344 | Lubkin | July 30, 1957 |
| 2,834,893 | Spencer | May 13, 1958 |
| 2,872,667 | Chen | Feb. 3, 1959 |

FOREIGN PATENTS

| | | |
|---|---|---|
| 1,105,870 | France | July 13, 1955 |